Dec. 15, 1936.  L. R. LUDWIG  2,064,021
ELECTRICAL CONVERSION SYSTEM
Original Filed Oct. 11, 1934
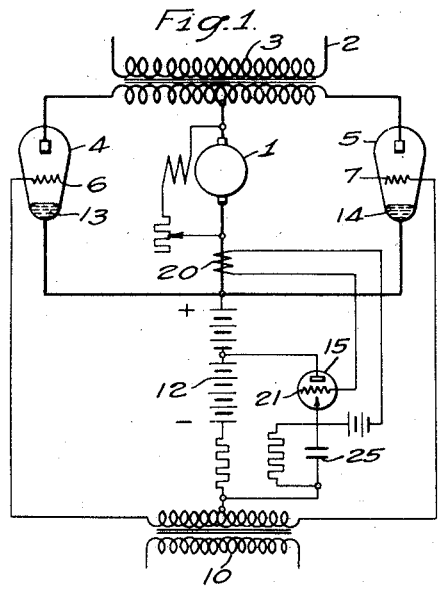
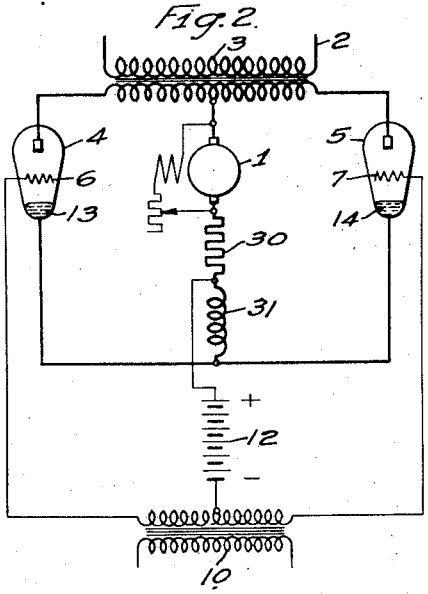
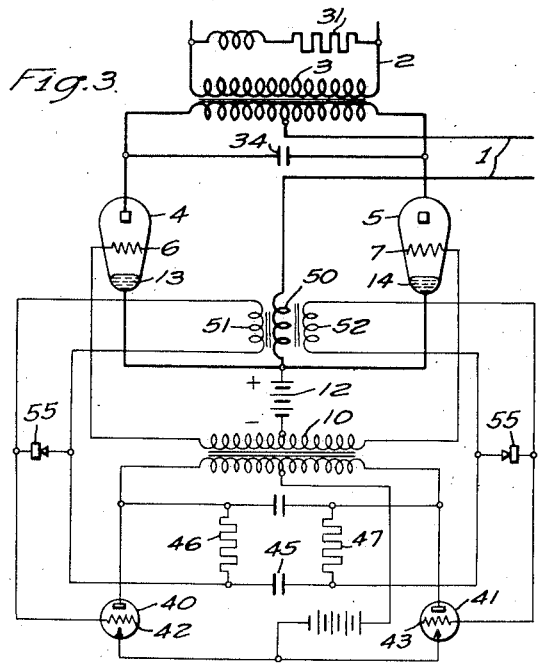
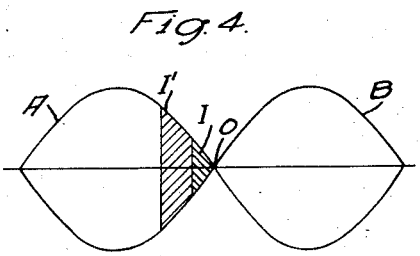
INVENTOR
Leon R. Ludwig
ATTORNEY Patented Dec. 15, 1936

2,064,021

UNITED STATES PATENT OFFICE 2,064,021

ELECTRICAL CONVERSION SYSTEM

Leon R. Ludwig, Forest Hills, Pa., assignor to Westinghouse Electric & Manufacturing Company, East Pittsburgh, Pa., a corporation of Pennsylvania Continuation of application Serial No. 747,913, October 11, 1934. This application February 14, 1936, Serial No. 63,869

11 Claims. (Cl. 175—363)

My invention relates to an electrical conversion system, and particularly, to a control system for a converter utilized for converting direct current into alternating current.

This application is a continuation of application Serial No. 747,913, filed October 11, 1934.

When an arc-type converter is utilized to produce alternating current from direct current each valve of the converter passes through three phases during each complete cycle of operation. The first of these phases may be termed the conducting period. The wave form of the output current of a converter is such that the current in any valve must rise from zero to its maximum value in a very short period of time.

When a converter is producing direct current an occasional commutation period of extra long duration or the delayed starting of one of the valves would pass unnoticed. But when the converter is operating to produce alternating current accurate commutation becomes a matter of great importance because then successful commutation depends upon accurate starting at fixed time intervals and complete transfer of the arc within a definite time interval after the starting of the valve. If the commutation is not completed within the allowed time period the converter fails to complete the commutation and the valve action is lost, resulting in a forward-fire.

The second phase may be termed the rectification period. When the current through a valve is reduced to zero the anode voltage rapidly becomes negative with respect to the cathode. During the short interval of time during which the anode remains negative there is a possibility that the valve will back-fire. In a converter producing alternating current a back-fire is of little importance as the reverse current resulting from a back-fire is rapidly reduced to zero and the only ill effect is that it leaves the arc space highly ionized and therefore greatly increases the probability of a forward-fire during the third phase of operation.

The third and in polyphase converters the longest period of the cycle may be termed the control period. During this period the anode is positive with respect to the cathode and control means must be provided to prevent the formation of an arc before the next conducting period is reached. The frequent loss of control during this period resulting in a premature arc formation or forward-fire is the most serious defect of heretofore known converters.

Forward-firing of the valves of the heretofore known converters results in a short circuit of both the supply and load circuits with consequent opening of breakers and interruption of service.

It is accordingly an object of my invention to provide a valve-type converter capable of riding through a forward-fire without interruption of service.

In the operation of converters for producing alternating current, it is necessary to commutate the valves of the converter during the time when the phase voltage of the valve being commutated is negative with respect to the phase voltage of the next succeeding valve. It has heretofore been found desirable to commutate the valves at a considerable time interval before the anode of the commutated valve becomes positive with respect to the anode of the succeeding valve. This results in the converter operating at a leading power factor. If a forward-fire should occur in one of the inactive valves of the converter, it is necessary to commutate the next succeeding valve sufficiently ahead of its usual commutating period, so that there will be sufficient leading wattless power in the converter to produce the commutation, in order to prevent an interruption of service.

In converters, as heretofore constructed, it has been necessary, to secure at all reliable operation, to constantly commutate the valves at such a leading power factor that most forward-fires will be eliminated. However, this method of operation is highly undesirable, as the poor power factor of the conversion necessitates additional k. v. a. capacity on the alternating current side of the converter.

In a conversion system according to my invention, the control potential for the valves of the converter is provided with suitable means for increasing the firing angle of the valves of the converter in response to a forward fire in any valve. The advancing of the firing angle of the next succeeding valve produces sufficient leading wattless power to commutate the valve and thus permits the converter to ride through the forward-fire without interruption of service. After the commutation of the forward-firing valve the firing time of the converter can be gradually returned to normal without loss of control, thus enabling the system to operate at the best possible power factor at all times.

It is a further object of my invention to provide means responsive to fault current in the converter for increasing the leading wattless power for producing commutation of the valves of the converter.

Other objects and advantages of my invention will be apparent from the following detailed description taken in conjunction with the accompanying drawing, in which:

Figure 1 is a schematic illustration of a converter according to my invention;

Fig. 2 is a view similar to Fig. 1 showing a modified means for varying the firing time of the converter;

Fig. 3 is a view showing a further modification of my control system; and

Fig. 4 is a graphical illustration of the potential relations in a single phase converter according to my invention.

In the operation of the valve type converter for producing alternating current from direct current, it is necessary to commutate the valves before the voltage in the transformer associated with the succeeding valve becomes greater than the transformer voltage of the commutated valve. This is accomplished by releasing the succeeding valve at a point prior to the point at which the anode voltage of the commutated valve becomes positive with respect to the anode voltage of the succeeding valve, thus drawing sufficient leading current from the converter to supply wattless power needed by the load.

In the event that the inactive valve loses control or forward-fires, prior to its normal conducting period, the current drawn from the direct-current line will rapidly increase, so that the rerease of the next succeeding valve at the normal time interval will afford insufficient commutating E. M. F. to extinguish the current flowing in the forward-firing valve. I have found that this may be corrected by increasing the commutating angle or advancing the firing time of the next succeeding valve, so that sufficient leading wattless current will be drawn to extinguish the current in the forward-firing valve. This is diagrammatically illustrated in Fig. 4 in which I designates the normal time of release for transferring the current from valve A to valve B, and I' indicates the time for releasing the valve B in order to secure commutation after the forward fire of valve A.

In the embodiment of my invention according to Fig. 1, a direct-current source 1 supplies load current to an alternating-current machine load system 2 through a coupling transformer 3 which is controlled by means of suitable electric valves 4 and 5 preferably of the vapor arc type. The valves 4 and 5 of the converter are provided with suitable control electrodes, usually in the form of control grids 6 and 7, which are supplied with control potential from a suitable control source, usually a control transformer 10, supplied with alternating current of the frequency desired in the alternating-current load system 2. A suitable direct-current bias 12 is provided between the cathodes 13—14 and the grids 6 and 7 of the valves 4 and 5 to determine the normal firing time for the valves 4 and 5 of the converter.

In the event of a forward-fire in one of the valves 4 or 5 of the converter, it is desirable to advance the firing time of the next succeeding valve, so that there will be sufficient commutating E. M. F. for sufficient time to commutate the current in the forward-firing valve. To accomplish this purpose, I have provided an auxiliary valve 15 for by-passing a portion of the biasing potential 12 so as to permit earlier firing of the next succeeding valve. For controlling the by-passing valve I provide a current transformer 20 in series with the direct-current source 1 to produce control potential for the grid 21 of the by-passing valve 15. To restore the firing time to normal after the operation of the by-passing valve 15, I prefer to provide a suitable capacitor 25 in series therewith.

In the operation according to this form of my invention, assuming that the left-hand valve 4 of the converter forward-fires, the increase of the direct current through the series transformer 20 will produce a voltage impulse which will release the grid 21 of the by-passing valve 15 and reduce the bias 12 applied to the grid 7 of the right-hand tube 5, and permit it to carry current at a time interval ahead of the normal firing time. The normal firing time of the tube is sufficiently ahead of the normal voltage zero of the valve being commutated, so that the E. M. F. associated with the area I of Fig. 4 is available to commutate the tube. However, by releasing the succeeding valve early, additional wattless power represented by the area I' is available to produce the desired commutation.

In the modification according to Fig. 2, the biasing potential necessary to advance the firing time of the tubes 4 and 5 is secured by means of the resistor 30 and reactor 31 placed in series with the negative terminal of the direct-current source 1 and the cathode of the valves 4 and 5. In the operation of my invention according to this modification, the firing time of the converter is varied in response to increase of current so as to produce sufficient wattless current to commutate the valves 4 and 5. The biasing potential is produced by reactor 31 in conjunction with the voltage drop through resistor 30. Upon an increase of current, there is generated in the reactor 31 a voltage tending to oppose the flow of current, the voltage generated in the reactor 31 impressed on the voltage of the biasing battery 12 to advance the firing time of the valves 4 and 5. Consequently, in case of forward fire and the resultant increase in the direct current, the firing time is advanced sufficiently to commutate the valevs 4 and 5.

The modification according to Fig. 3 shows an embodiment of my invention particularly adapted for supplying static alternating-current loads. The direct-current source 1 supplies the static load 31 through the transformer 3, which is controlled by the valves 4 and 5, and since there is not a back voltage for commutating the converter, a suitable commutating capacitor 34 is provided across the terminals of the transformer 3. The control electrodes of the valves 4, 5 of the converter are connected to the terminals of a suitable control transformer 10 which is, in turn, fed from a converter producing a fixed frequency. This converter is supplied with direct current through valves 40—41, preferably of the grid-controlled type, and the grid supply for the grids 42—43 of the valves 40—41 is provided by means of a capacitor 45 connected across the primary of the auxiliary transformer. Suitable resistors 46—47 are inserted between the terminals of the transformer and the terminals of the capacitor 45 for determining the normal frequency of operation of the grid-controlled tubes 40—41. A current transformer 50 is connected in series with the direct-current source 1, said transformer 50 having a plurality of secondary windings 51—52 which are connected in series between the control capacitor 45 and the grids 42—43 of the auxiliary valves 40—41. In the event of forward-fire of one of the main valves 4—5 of the converter, the increase in current in the direct-current system 1 will produce a voltage in the secondaries 51—52 of the current transformer 50, which voltage is connected in series with the normal voltage of the timing capacitor 45, so that the increase in current in the direct-current system releases the grids 42—43 of the auxiliary tubes 40—41 at an earlier time and momentarily increases the frequency applied to the control transformer 10 to advance the release of the control electrodes 6—7 of the converter valves 4—5.

In order to prevent undue retarding of the firing time of the valves 40—41 in response to decrease in direct current, a by-pass valve 55 preferably of the copper-oxide type, is placed in parallel with the secondaries of the current transformer.

For the purposes of simplicity and illustration, my invention is applied to single-phase systems. However, in normal operation, a converter will be polyphase and the valves and control system will be multiplied accordingly.

While I have shown specific embodiments of my invention for purposes of illustration, it will be apparent to those skilled in the art that changes and modifications may be made therein without departing from the true spirit of my invention, or the scope of the appended claims.

I claim as my invention:

1. A vapor electric converter for producing alternating current from direct current comprising a plurality of arc type valves, control grids for said valves, a source of control potential for said grids and means responsive to forward fire in one of said tubes for advancing the firing point for the next succeeding tube.

2. A vapor-electric converter for producing alternating current from direct current comprising a plurality of arc type valves, control grids for said valves, a source of control potential for said grids and means responsive to forward fire in any one of said valves for advancing the firing point for the next succeeding valve, and means for gradually returning the firing point to normal.

3. An electrical translating system comprising a source of direct current, an alternating-current load, a transformer interconnecting said source and said load, a valve type converter connected to said transformer for controlling the flow of current therein, control means for each valve of said converter, an auxiliary converter for producing control potential of a predetermined frequency, connections for supplying said control potential to the control means for said valves, and a current transformer responsive to an increase of current in said system for advancing the phase of the control potential produced by said auxiliary converter.

4. An electrical translating system comprising a source of direct current, an alternating-current load, a transformer interconnecting said source and said load, a valve type converter connected to said transformer for controlling the flow of current therein, control means for each valve of said converter, an auxiliary converter for producing control potential of a predetermined frequency, connections for supplying said control potential to the control means for said valves, and a current transformer responsive to an increase of current in said system for advancing the phase of the control potential produced by said auxiliary converter, and means connected in parallel with said current transformer for preventing a decrease of current in said system from changing the phase relationship of said control potential.

5. An electric translating system comprising an alternating-current load circuit, a direct current supply circuit, a multi-valve arc-discharge device for controlling the flow of current between said circuits, a control electrode for each valve of said device, a transformer for supplying control potential to said control electrode, a source of biasing potential connected to said transformer for controlling the firing time of said valves, and means, responsive to a forward fire in one of said valves, for varying said biasing potential for advancing the firing time of said valves.

6. An electric translating system comprising an alternating-current load circuit, a direct-current supply circuit, a multi-valve arc-discharge device for controlling the flow of current between said circuits, a control electrode for each valve of said device, a transformer for supplying control potential to said control electrode, a source of biasing potential connected to said transformer for controlling the firing time of said valves, and means, responsive to a forward fire in one of said valves, for varying said biasing potential for advancing the firing time of said valves, and a capacitor in series with said means for restoring said biasing potential.

7. A vapor-electric converter for converting direct current to alternating current comprising a source of direct current, a multi-valve vapor-electric converter, a control electrode associated with each valve of the converter, a source of control potential having a frequency for determining the frequency of the output potential of the converter and means responsive to abnormal firing of one of the valves of the converter for rapidly advancing the phase relationship of said control potential.

8. A vapor-electric converter for converting direct current to alternating current comprising a source of direct current, a multi-valve vapor-electric converter, a control electrode associated with each valve of the converter, a source of control potential having a frequency for determining the frequency of the output potential of the converter and means responsive to abnormal firing of one of the valves of the converter for rapidly advancing the phase relationship of said control potential, said means being actuated by return of normal condition in said converter to retard the phase relation of said control potential to normal.

9. A vapor-electric converter comprising a direct-current supply circuit, an alternating-current load circuit, a transformer interconnecting said circuits, a multi-valve discharge device for controlling the flow of energy through said transformer, a control electrode for each of the valves of said device, a source of control potential for said control electrode, a direct-current bias superimposed on said control potential, means for short circuiting at least a portion of said biasing potential, and means responsive to faulty operation of one of said valves for controlling said short circuiting means.

10. A vapor-electric converter comprising a direct-current supply circuit, an alternating-current load circuit, a transformer interconnecting said circuits, a multi-valve discharge device for controlling the flow of energy through said transformer, a control electrode for each of the valves of said device, a source of control potential for said control electrode, a direct-current bias superimposed on said control potential, means for short circuiting at least a portion of said biasing potential, and means responsive to faulty operation of one of said valves for controlling said short circuiting means, and means for gradually restoring said biasing potential.

11. An electrical translating system comprising a source of direct current, an alternating-current load, a transformer connecting said source to said load, a plurality of electric valves for regulating current flow through said transformer, a control electrode for each of said valves and means for supplying control potential to said control electrodes comprising an auxiliary transformer having terminals connected to said control electrodes, a supply of direct current connected to said auxiliary transformer, grid-controlled electric valves for controlling the flow of current in said auxiliary transformer, a capacitor for normally supplying control potential to the grids of said grid controlled valves, means for charging said capacitor from said auxiliary transformer, a current transformer in series with said source of direct current, and means for impressing the secondary potential of said current transformer on the potential of said capacitor for controlling the firing time of said grid-controlled valves.

LEON R. LUDWIG.